United States Patent [19]

Wilkinson et al.

[11] Patent Number: 4,844,937
[45] Date of Patent: Jul. 4, 1989

[54] METHOD FOR MAKING PUFFABLE FOOD PRODUCTS FROM CORN AND PRODUCTS PRODUCED THEREFROM

[75] Inventors: Raleigh J. Wilkinson, Lockport; Allen T. Short, Barrington, both of Ill.

[73] Assignee: J. R. Scott Milling Company, Chicago, Ill.

[21] Appl. No.: 177,831

[22] Filed: Mar. 22, 1988

Related U.S. Application Data

[63] Continuation of Ser. No. 37,054, Apr. 13, 1987, abandoned, which is a continuation of Ser. No. 836,704, Mar. 6, 1986, abandoned.

[51] Int. Cl.⁴ ............................................. A21D 10/00
[52] U.S. Cl. ..................................... 426/559; 426/449
[58] Field of Search ............... 426/104, 549, 448, 449, 426/143, 622, 512, 516, 443, 445, 446, 447, 450, 455, 456, 458, 559

[56] References Cited

U.S. PATENT DOCUMENTS

| | | | |
|---|---|---|---|
| 3,150,978 | 9/1964 | Campfield | 426/559 |
| 4,251,551 | 2/1981 | Van Hulle et al. | 426/458 |
| 4,409,250 | 10/1983 | Van Hulle et al. | 426/458 |
| 4,590,081 | 5/1986 | Sawada et al. | 426/448 |
| 4,608,261 | 8/1986 | Mackenzie | 426/445 |
| 4,623,546 | 11/1986 | Holay | 426/448 |
| 4,623,548 | 11/1986 | Willard | 426/559 |
| 4,623,550 | 11/1986 | Willard | 426/559 |
| 4,769,253 | 9/1988 | Willard | 426/559 |
| 4,770,891 | 9/1988 | Willard | 426/559 |
| 4,778,690 | 10/1988 | Sadel | 426/448 |

*Primary Examiner*—Donald E. Czaja
*Assistant Examiner*—Carolyn Paden
*Attorney, Agent, or Firm*—Roylance, Abrams, Berdo & Goodman

[57] ABSTRACT

Puffable food half products, particularly snack food half products, are made from finely particulate corn materials, especially corn reduction flour, in which the gelatinizable starch content is at least predominantly from the horny endosperm of the corn, starch from the soft or floury endosperm being at least minimized. The invention makes it possible to produce a half product in which the starch content is predominantly or entirely from corn and which will expand, at least by frying and advantageously also by baking and, in some cases, microwaving and which will puff to a final product in which the maximum dimension is twice that of the half product.

9 Claims, 4 Drawing Sheets

METHOD FOR MAKING PUFFABLE FOOD PRODUCTS FROM CORN AND PRODUCTS PRODUCED THEREFROM

This is a continuation of Ser. No. 037,054 filed Apr. 13, 1987, which is a continuation of Ser. No. 836,704 filed Mar. 6, 1986.

This invention relates to the production of puffable food products and particularly to the production of new half products, at least predominantly from corn, which can be converted into final food products, such as puffed snack foods. In particularly advantageous embodiments, the invention provides half products which can be puffed at least by frying and baking and, in some embodiments, also by microwaving.

BACKGROUND OF THE INVENTION

Historically, food products in the half product stage were prepared in Oriental countries from starchy root vegetables, particularly cassava, the half products being desirable because they can be stored under room temperature conditions. In more recent times, the techniques employed early in the Orient have become popular for preparing half products from potato starch or potato flour. A significant advance in the art of marking food half products occurred when Wayne W. Campfield developed the method disclosed in U.S. Pat. No. 3,150,978. According to that method, a raw starch-containing material, ranging from "corn flour" to potatoes or tapioca, is combined with water to form a dough, the dough is cooked while being worked in order to gelatinize the starch content, the cooked dough is then cooled while confined, the cooled dough is then extruded and cut into pieces under conditions such that the pieces will not expand significantly, and the pieces are then dried. More recently, special plant equipment has been made available to the snack food trade by Mapimpianti S.P.A., Galleria, Italy; Creuset-Loire, Firminy, France and Wenger Mfg. Co., Sabetha, Kansas, and the new equipment has enabled the trade to achieve relatively high speed production of half products for snack foods and the like.

As the art of making half products for snack foods and the like progressed, specifications for the products became increasingly severe. Thus, while early snack foods were typified by so-called "corn chips", the demand soon increased to products of relatively complex, precisely predetermined shape, such as fish shapes, wagon wheels, grids, helices, etc. And the extent of expansion, comparing the half product to the final puffed product, progressively increased so that a marketable half product now must puff to at least about twice its size. Then, despite the increasing complexity of the shapes, it became necessary to achieve by puffing an expansion which is uniform throughout the piece. Finally, increasingly strict requirements have arisen as to texture, mouth feel and flavor. In order to meet such increasingly strict specifications, the trade has adopted potato flour, potato starch and tapioca as the sources of dextrinizable starch and has come to rely on frying in oil as the method for puffing the half product.

The increasing popularity of puffed snack foods and like products has created a demand for an acceptable half product in which the starch material is at least predominantly from corn. So long as the product was of a simple shape and extensive puffing was not required, products have been produced by following the general teachings of Campfield U.S. Pat. No. 3,150,978. However, even with the advent of the improved production apparatus now available for making half products, the trade has not produced a corn half product which would satisfy today's market requirements. We have concluded that at least some of the difficulties encountered in prior-art efforts to make modern day puffable half products from corn have arisen from the fact that prior to, e.g., 1970, such raw materials as "corn flour" had a complex and unpredictable makeup which, though satisfactory for ordinary cooking and baking purposes, is not satisfactory for making half products of complex shape and which must have a high degree of puffability. Thus, the then-available dry milled corn flours resulted from combining all of the flour streams of the mill into a single bin, so that the "corn flour" was a combination of rebolt flour and reduction flour, with perhaps other flour fractions and minor proportions of non-flour materials. Though such flours can be used to make a half product, the resulting half product will not puff to the extent required by today's market, puffing will not be uniform throughout the piece, and the eating qualities will not satisfy today's standards when the half product is of complex shape.

SUMMARY OF THE INVENTION

We have discovered that, to make a snack food half product which will satisfy today's market requirements and in which the starch raw material is all corn or predominantly corn, without using expensive additives to assure puffability, not just any type of corn raw material can be used. Thus, we have found that the corn must be a finely particulate material derived predominantly from the horny endosperm of the kernel and therfore low in those constituents derived from the soft endosperm, germ and bran. Thus, the usual corn flours, unground corn grits, and corn meal, for example, are not suitable. It appears that the presence of substantial amounts of starch from the soft endosperm renders the product less uniform and inhibits puffing. Puffing is also inhibited by presence of an excessive amount of corn oil and by an excessive amount of bran material.

When the corn material has been so chosen that, under the practical conditions of milling, only the practical minimum of starch from the soft endosperm is present, half products produced according to the invention can be formed from a mix consisting of corn and water, and for most shapes the half product will expand to such an extent during puffing that the maximum dimension of the half product increases by 100%, with puffing being uniform throughout the product and with texture, mouthfeel and flavor being superior when compared to products which, though using a corn raw material, require such expensive puffing-promoting additives as tapioca starch. Further, half products so produced can be puffed by frying, by baking and, depending upon the particular shape, by microwaving. In cases where microwaving is difficult, we have discovered that addition of 1-3% of an edible sodium salt, advantageously sodium chloride or sodium bicarbonate, to the formula will render the product microwavable.

Though the invention is most advantageous when corn is the only source of gelatinizable starch employed, the invention is also applicable when, because of a particular ingredient required by consumers, puffing cannot be achieved without use of an expensive additive such as pregelatinized tapioca starch. Thus, snack foods including almond flour are desirable but cannot be puffed adequately without using substantial amounts of, e.g., tapioca starch. But when the special corn materials of the invention are used, the amount of tapioca starch employed can bemarkedly reduced without decreasing the puffability of the half product.

The method of the invention also requires controlled processing conditions, particularly during gelatinization of the starch, in order to assure that the half product is made up of a very uniform matrix of gelatinized starch having minute capillary-like internal voids in which a substantial portion of the moisture of the half product is trapped. Gelatinization is most advantageously carried out in a single screw type cooker extruder operated under low shear conditions and with the temperature increasing progressively or stepwise from at least 55° C.(131° F.) at the input end of the extruder barrel to not more than 160° C.(320° F.) at the exit end of the barrel. Temperatures in excess of 160° C.(320° F.) will break down the starch and ruin the product. Within the foregoing range, the temperatures depend upon the size and throughput rate of the gelatinizer employed, higher temperatures being employed for large scale apparatus with a high production rate and lower temperatures for smaller scale apparatus.

The half products according to the invention are novel products in which the body of the half product comprises a very uniform matrix of gelatinized starch which is predominantly from the horny endosperm of corn, at least a substantial proportion of the moisture content of the half product being retained in extremely small capillary-like voids which are uniformly distributed through the body of the half product. The half products contain 9.5-14%, advantageously 10-13%, by weight total moisture and, except for some particularly complex shapes having portions which are particularly thick in comparison to other portions, can be puffed by baking and by microwaving, as well as by conventional frying.

IDENTIFICATION OF THE DRAWINGS

FIG. 1 is a flow diagram of one typical embodiment of the method;

FIGS. 2-2C are scanning electron micrographs at 3200X of. respectively, the cross section of a half product formed from potato flour, the cross section of a half product formed from dry milled rebolt corn flour, the cross section of a half product formed from dry milled corn reduction flour according to the invention, and the cross section of a half product formed according to the invention from a corn flour made by milling grits from degerminated corn;

FIGS. 3-3C are scanning electron micrographs at 1000X of the outer surfaces of the respective half products identified in the preceding paragraph; and FIGS. 4-4C are perspective views of typical half product shapes which can be made according to the invention.

DETAILED DESCRIPTION OF THE INVENTION

The Corn Materials Employed

Figure 1:
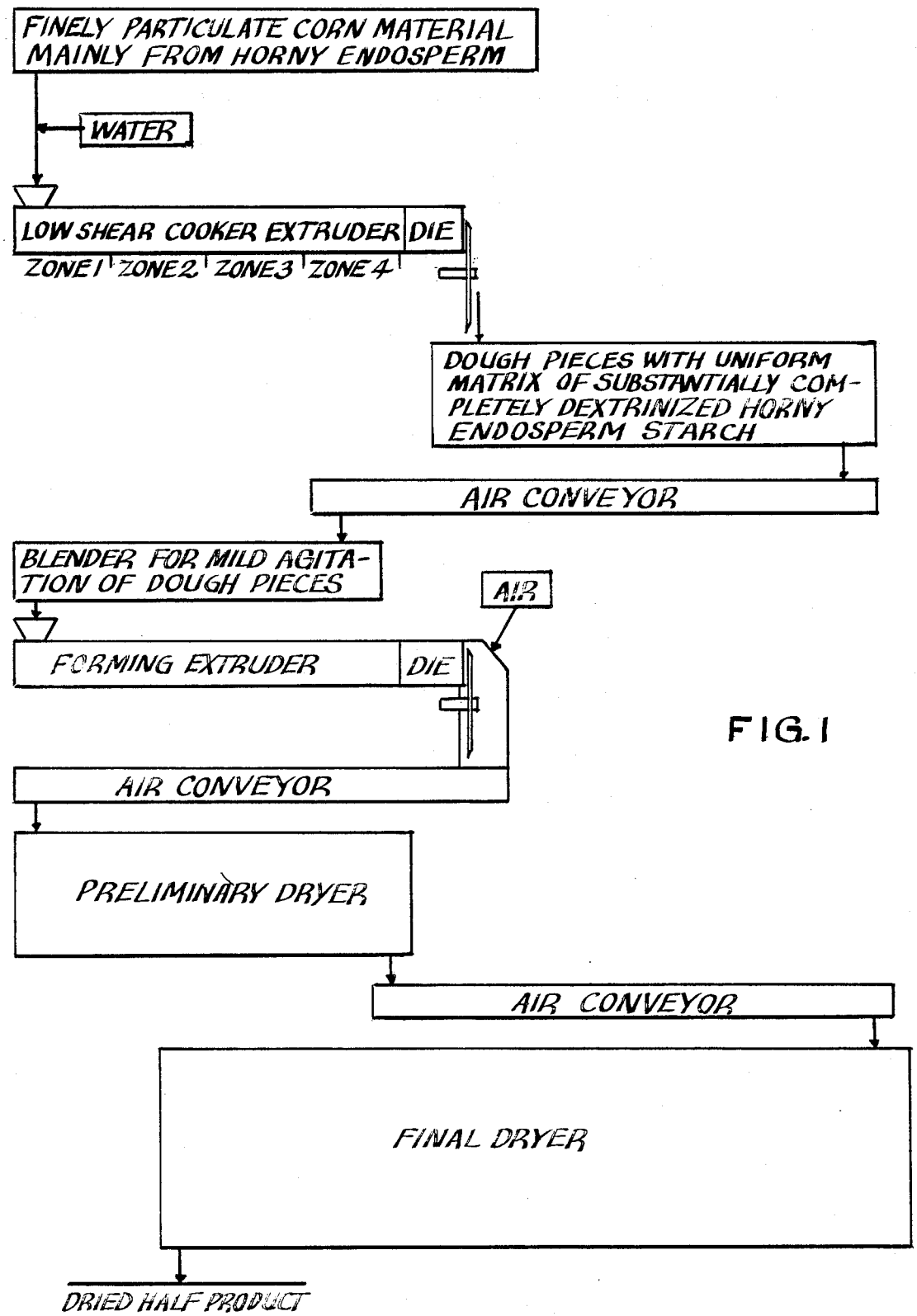

The method is dependent upon use of a corn material which, upon gelatinization under conditions of relatively low shear mixing and temperatures not exceeding about 160° C.(320° F.), advantageously not exceeding 155° C.(311° F.), will form a relatvely uniform matrix, at least mainly of starch from the horny endosperm of the corn kernel, which contains relatively few gross voids yet includes a relatively large number of small, closed, capillarly-like cells or voids capable of retaining a substantialy proportion of the total moisture content of the dough mixture employed. Such corn materials are relatively free of not only corn oil but also starch from the soft endosperm (also known as the floury endosperm) and bran material. We have found that, while the starch from the horny endosperm is beneficial in our method, the starch from the soft endosperm is not only not beneficial to the method but also acts as a diluent and is deleterious.

Foremost among the useful corn materials is that flour ottained in dry milling of corn (either yellow or white) which is referred to as "reduction flour", that is, the fraction of corn flour recovered immediately after corn particles have passed through a set of reducing rollers. In dry milling, it is not practical to produce a fraction which is absolutely free of undesired components. However, reduction flour is derived mainly from the horny endosperm of the corn kernel, is essentially free of germ and bran material, and includes at most only a few percent by weight of material from the soft endosperm. Over 10% by weight of material from the soft endosperm in reduction flour would be extraordinary.

Similarly useful in our method is the dry milled horny endosperm flour obtained by first tempering whole corn, then running the tempered kernels through a degerminator to provide a discarded fraction including the germ and bran materials and a fraction for further processing, including mainly material from the horny endosperm and the soft endosperm. The latter fraction is then run through a roller mill, screened and dried to produce a discarded fraction including the soft endosperm flour (usually called rebolt flour) and a horny endosperm fraction. The latter fraction is ground to a flour which can be called "horny endosperm flour".

Whether using redoction flour or horny endosperm flour, the starch of the flour consists mainly of the superior starch from the horny endosperm of the corn and is poor in materials which inhibit formation of a half product which will puff satisfactorily. Analysis of the useful corn materials is as follows:

| Constituent | Percent by Weight | |
| --- | --- | --- |
| | Minimum | Maximum |
| Fat | 0.0 | 2.0 |
| Moisture | 9.5 | 12.5 |
| Starch | 65.0 | 80.0 |

In the most useful products, the starch content is at least predominantly from the horny endosperm, a starch which is distinctly different from the starch from the soft endosperm and which appears to be responsible for the success of the method. When the analysis of the corn material is within the limits set out in the table immediately above and the corn material is derived predominantly from the horny endosperm, satisfactory half products can be made without supplementing the corn starch with a puffability-improving additive.

The corn material must be finely particulate, with not more than 2% by weight remaining on a 20 mesh screen (U.S. Standard Series) and not more than 15% by weight passing a 200 mesh screen. Thus, not more than 20% of the particles should have a maximum dimension exceeding 850 microns and not more than 15% should have a maximum dimension smaller than 75 microns. Advantageously, not more than 10% by weight remains on a 60 mesh screen (larger than 250 microns) and at least 35% by weight passes a 100 mesh screen (smaller than 150 microns).

The Method

The finely particulate raw corn material, typically dry milled reduction flour from yellow corn, is combined with sufficient water to bring the moisture content within the range of 30-40% by weight, and the corn material and water mix is delivered to a conventional single screw cooker extruder 1, FIG. 1, for processing to gelatinize the starch content of the corn material. The cooker extruder is operated to mix the material, under low shear conditions, into a uniform dough and subjects the mix to temperatures which increase from the input end of the extruder barrel toward the die, commencing at at least 55° C. (131° F.) adjacent the input and increasing, stepwise or progressively, to no more than 160° C.(320° F.) at the output end of the barrel, the precise temperatures depending upon the size and throughput rate of the cooker extruder. For best results, the barrel of cooker extruder 1 is divided into four equal zones each equipped with electrical resistance heaters. The following table gives operative temperature ranges for the four zones for a semiworks or pilot plant apparatus and for a full scale production plant.

| ZONE | TEMPERATURE RANGES | |
|---|---|---|
| | Semiworks (2 in. Screw Diameter) | Full Scale (8 in. Screw Diameter) |
| 1 | 55-75° C. (131-167° F.) | 120-130° C. (248-266° F.) |
| 2 | 75-85° C. (167-185° F.) | 130-140° C. (266-284° F.) |
| 3 | 100-115° C. (212-239° F.) | 140-155° C. (284-311° F.) |
| 4 | 115-125° C. (239-259° F.) | 150-160° C. (302-320° F.) |

Optimum temperatures for the four zones are 70° C.(158° F.), 85° C. (185° F.), 110° C.(230° F.) and 120° C.(248° F.) for the semiworks scale apparatus and 125° C.(257° F.), 135° C.(275° F.). 145° C.(293° F.) and 155° C.(311° F.) for a full scale apparatus with cooker extruder 1 having a screw diameter of 8 in. Residence time of the mix in the barrel of cooker extruder 1 is in the range of 1-1.5 min. and the head pressure is sufficiently low to cause the dough to oozer from the die in the form of a relatively shapeless glob. Such operation of cooker extruder 1 achieves a uniform and substantially complete gelatinization of the starch and not only distributes the added water uniformly through the dough during the mixing operation but also causes at least a substantial part of the moisture to be entrapped in the tiny capillary-like cells of the starch matrix by the time the mix, now in the form of a uniform dough, is forced through the die orifice or orifices.

The dough emerging from the die of cooker extruder 1 is cut by rotary knife 2 into relatively small glob-like pieces 0.5-4 in. (1.3-10 cm.) long, each piece consisting of a uniform dough matrix in which the starch is up to 98% gelatinized, as measured by the Maltese Cross test, with the matrix having substantially the same total moisture content as did the corn material after the water was added. Despite the relatively high moisture content, the dough pieces are individually coherent and can be handled and conveyed. After being cut off by knife 2, the dough pieces are delivered by air conveyor 3 to blender 4, typically a radial blade rotary blender, which subjects the dough pieces to a relatively gentle agitation in the presence of ambient air so as to reduce the moisture content at and near the surfaces of the pieces. The pieces are then delivered directly into the input end of a kneading and forming extruder 5. The dough pieces are treated in blender 4 for a period time such that the total moisture content of the pieces is reduced by 3-10%, bringing the moisture content down to the range of 25-37% by weight.

Extruder 5 is so designed as to have a first stage, which serves primarily to knead the dough pieces into one continuous mass, and a second stage, which is adjacent the die and serves to compact the dough mass just before it enters the die. The extruder is of the type in which both the screw and the barrel are water cooled, with the cooling water exit temperature being measured, and the operator observes the extruded material and adjusts the cooling water temperature to make the dough firmer or more pliable, as required to achieve adequate shaping and proper cutting of the extruded material. The die structure of extruder 5 includes a preliminary portion to divide the dough mass into a plurality of individual strands, and a die orifice for each strand, the orifices converting the strands into the desired cross-sectional shape. Head pressure for extruder 5 is 1160-1855 p.s.i., advantageously 1400-1680 p.s.i. Upon emerging from the die orifices, the strands are cut into individual pieces by rotary knife 6. As they are cut off at the die orifices, the individual formed pieces are directed by an air stream through a confining shroud 7 into air conveyor 8 and delivered by that conveyor to the input hopper of a predryer 9.

Dryer 9 is of the endless belt type in full scale production apparatus and, for practical purposes, a static dryer is used in semiworks scale operations. When of the continuous belt type, the belts are of screen material and the drying atmosphere is directed upwardly through the layer of formed half product pieces supported by the belt. The drying atmosphere can be ambient air at 70°-80° C.(158°-176° F.). Residence time in the dryer is selected to effect removal of the surface moisture from the formed pieces before discharge from the dryer so that the formed pieces are then substantially non-sticky. The surface moisture of the formed pieces does not exceed 5% by weight and is usually less, so that the pieces as discharged from predryer 9 have a total moisture content of not less than 20% by weight, advantageously 20-24%, with substantially all of the moisture being uniformly distributed internally of the formed piece.

After discharge from dryer 9, the formed pieces are delivered by air conveyor 10 to a final dryer 11 by which the formed pieces are slowly dried, without case hardening, until the total moisture content is in the range of 9.5-14%, advantageously 10-13%, by weight. For full scale production, dryer 11 advantageously includes several stages through which the formed pieces are carried by foraminous endless conveyor belts, a drying atmosphere of controlled temperature and humidity being passed upwardly through the conveyor belts and the layers of formed pieces carried thereby. Excellent results are achieved when the dryer includes five successive stages, with the drying atmosphere being air at 50°-53° C.(122°-127.5° F.) and a relative humidity of 81% in the first stage; 54°-57° C.(129°-134.6° F.) and a relative humidity of 92% in the second stage; 53°-57° C. (127.5°-134.6° F.) and a relative humidity of 89% in the third stage, 50°–54° C.(122°–129° F.) and a relative humidity of 84% in the fourth stage, and 45°–50° C.(113°–127° F.) and a relative humidity of 34% in the fifth stage. Residence times in the five stages can be equal, with a total residene time in the dryer of 6–8 hours.

When only corn flavor is desired, no flavor additives are required and the formulation can consist of the special corn material and water. When microwaveability is to be increased, salt or an equivalent edible sodium salt can be included in the initial mix of corn material and water. Where other ingredients, such as flavoring additives, are required, these too can be included in the initial mix.

The following examples are illustrative.

EXAMPLE 1

Cooker extruder 1 was a conventional single screw cooker extruder manufactured by Mapimpianti S.P.A. and having a 2 in. screw diameter, the barrel being equipped with four electrical resistance heaters for controlled heating of the four successive zones of the extruder, the extruder screw being conventionally designed for low shear operation, and the extruder being operated at such low head pressures that the head pressure was not measured. Such apparatus is of pilot plant or semiworks scale and is used in experimental runs for the sake of economy.

A dry milled reduction flour from yellow corn was used as the source of gelatinizable starch. The flour had an initial moisture content of 10.5% by weight and a fat content of 1.5% by weight. The particle size distribution of the flour was such that only 4.3% by weight remained on a 60 mesh U. S. Standard Series screen and 35.6% by weight passed a 100 mesh screen. The mixture supplied to cooker extruder 1 consisted of 74.7% by weight corn reduction flour and 25.3% by weight added water. Cooker extruder 1 was operated at 70° C.(158° F.) in the first zone, 85° C.(195° F.) in the second zone, 110° C.(230° F.) in the third zone and 120° C.(248° F.) in the fourth zone. The screw was operated at 37 r. p. m. The die orifice was of circular transverse cross section and the dough emerged from the orifice more as an oozing glob than a shaped strand. Knife 2 was rotated at a speed such that all of the dough pieces obtained were in the size range of 0.5–4 in. (1.3–10 cm.) in length. The dough pieces were air-conveyed to blender 4 and there agitated for 5 min., then delivered directly into the input end of forming extruder 5. Moisture content of the dough pieces as delivered to the forming extruder was approximately 25% by weight.

The extrusion orifices of the die of forming extruder 5 were shaped to provide each extruded strand with a diameter of 1.2 in. (3.1 cm.) and the wagon wheel transverse cross section seen in FIG. 4. Extruder 5 was operated with a screw temperature of 27° C.(80.6° F.), a barrel temperature of 40° C.(104° F.) and a head pressure within the range of 1400–1680 p.s.i. Knife 6 was rotated at a speed such that the formed pieces cut off by the knife had a thickness of approximately 0.05 in. (1.25 mm.). The shaped pieces thus obtained were air-conveyed to preliminary dryer 8, in this case a static dryer in which the pieces were shelf-supported rather than being conveyed and were subjected to flowing air as the drying atmosphere at 78° C.(172° F.) for 1.5 min to remove surface moisture and render the shaped pieces non-sticky. The shaped pieces were then air-conveyed to final dryer 10, in this case again a static dryer. The flowing drying atmosphere in dryer 10 was air 60° C.(140° F.) and a relative humidity of 85%, residence time of the product in the dryer being 6 hours.

Figure 4:
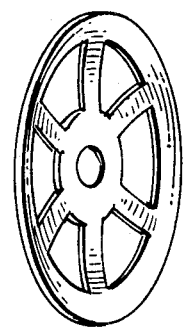

The half products thus produced were of substantially uniform size, shape and color, all being slightly cupped as seen in FIG. 4 and all having a very hard, slightly shiny external surface of uniform yellowish color described by some observers as golden and others as a yellowish tan. In 85% of all of the half products, the rim was essentially circular, the remaining 15% having one rim portion extending between two adjacent "spokes" which curved slightly inwardly, the remainder of the rim being essentially circular. The half products were so uniform that the diameter of the "hub" openings did not vary by more than 0.1 in. (0.25 mm.) and there was no discernible difference in either the width or the thickness of the "spokes" or the width or the thickness of the rim. The half products were sufficiently strong to support a total weight in excess of 3.6 lbs. (1.31 kg.) applied to the center of the half product when the half product had been placed concave side down on a supporting surface.

Some of the half products were puffed by frying conventionally in soybean oil at 188° C.(370° F.) for 45 seconds, taking care to maintain the pieces submerged in the oil for the entire frying operation. Others of the half products were puffed by baking in an oven of the forced air type, in which the half products were advanced through the oven at a controlled rate by a foraminous horizontal conveyor, the oven being gas fired above and below the conveyor with hot air forced through the entire bed of product being conveyed. The oven was operated at 218° C.(425° F.) and residence time of the half products in the oven was 2 minutes. In both frying and baking, the half products expanded by approximately 100%. The puffed products retained the general wagon wheel shape but became highly irregular, the cup shape of the half product being amplified by puffing and rim and spokes expanding into sharp edged generally elliptical cross section. The fried product had a crispy mouth feel, with "crispy" used in the sense of crispiness of a soda cracker. The baked product was lighter in mouth feel than the fried product and was crunch, with "crunchy" used in the sense of crunchiness of a graham cracker. The crunchiness of the baked product persisted well after chewing commenced. Both products, being highly puffed, gave an impression of lightness during eating which is not approached by ordinary corn snack foods. Both products exhibited a pleasant corn flavor, though the fried product gave a slight aftertaste of fat, this being completely absent in the baked product. In both the fried and the baked products, puffing was uniform throughout the piece.

EXAMPLE 2

The procedure of Example 1 was repeated without material change except for substituting for the corn reduction flour a dry milled yellow corn flour produced by passing tempered raw corn through a deferminator, separating the resulting product into a discarded fraction including the gern and bran material and a flour fraction including both flour from the horny endosperm and flour from the soft endosperm, passing the flour fraction through a roller mill and screening the milled product to provide a horny endosperm fraction and a soft endosperm fraction, recovering the horny endosperm fraction, and grinding the recovered fraction to a flour of the particle size distribution described in Example 1. Both the half product and, on frying and baking, the puffed products, were essentially the same as the products of Example 1.

EXAMPLE 3

The procedure of Example 1 was repeated without material change except for substituting for the corn reduction flour a dry milled yellow corn rebolt flour in which the starch content was predominantly from the soft or floury endosperm of the corn kernel. The resulting half products were similar to those obtained in Example 1 except paler in color. Upon frying as described in Example 1, the half products produced a puffed product but with no more than half the expansion achieved in Example 1. The fried products were much less crisp than the fried products obtained in Example 1. Upon baking, the products showed only nominal puffing, resulting in a product which would not be salable.

EXAMPLE 4

The general procedure of Example 1 was repeated, but to produce a potato half product rather than a corn half product. An initial dry mix having the following formulation was prepared:

| Ingredient | Percent By Weight |
| --- | --- |
| Potato granules | 40 |
| Pregelatinized potato starch | 30 |
| Modified potato starch | 18 |
| Potato flakes | 10 |
| Salt | 2 |

Figure 4A:
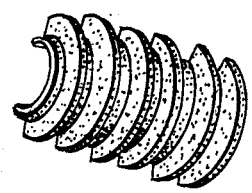

This is a conventional formulation for making potato half products. The modified potato starch was a conventional pregelatinized distarch phosphate. Sufficient water was added to the dry mix to bring the total moisture content to 33% by weight. Cooker extruder 1 was operated with the first zone at 70° C. (158° F.). the second zone at 85° C.(185° F.), the third zone at 95° C.(203° F.) and the fourth zone at 110° C.(230° F.). Since the wagon wheel half product shape produced in Example 1 is particularly difficult, the forming extruder was equipped with a die to produce the finned "radiator" shape of FIG. 4A, but the forming operation was otherwise as described in Example 1. Drying was carried out as in Example 1. The finished half products were hard, lacked the shiny appearance of the corn half products, and were of a uniform grayish tan color. When fried as described in Example 1, the half products expanded, by somewhat less than 100%, into a puffed product of light brown color. The product had an extremely rough grainy surface, best characterized as pebbly. While the puffed corn products of Example 1 gave an impression of lightness and smoothness, the potato products gave an impression of coarseness. During eating, the potato product was distinctly crunchy, with the crunchiness persisting well. The products had a strong potato flavor but gave a rather strong and different aftertaste as chewing was completed. Attempts to puff the potato half products of this example by baking failed.

CHARACTERIZATION OF THE HALF PRODUCTS OF EXAMPLES 1-4 BY SCANNING ELECTRON MICROSCOPY

The half products obtained in Examples 1-4 were characterized by electron microscopy with the results seen in the micrographs of FIGS. 2-2C and 3-3C. Samples for FIGS. 2-2C were prepared by excising a small piece from each half product, using a miniature saw, then placing the excised piece in liquid fluorinated hydrocarbon refrigerant at approximately −190° C.(−310° F.) and allowing the piece to equilibrate thermally, then transferring the piece to liquid nitrogen and fracturing the piece to present a cross-sectional surface, then placing the piece under vacuum to allow the liquid nitrogen to boil off and any remaining water ice crystals to be removed by sublimation, then mounting the sample on the scanning electron microscope stub, evaporatively coating the cross-sectional surface with carbon and sputter coating with gold to render the cross-sectional surface electrically conductive. Samples for observation of external surface characteristics (resulting in the micrographs of FIGS. 3-3C) were prepared simply by cutting a small piece from the half product by use of a miniature saw, mounting the piece on the stub and then evaporatively coating the external surface with carbon and sputter coating with gold. Thus prepared, the samples were observed with a Cambridge Nodel S-180 scanning electron microscope, photographs being taken with POLAROID Type 52 film, positive only.

Figure 2:
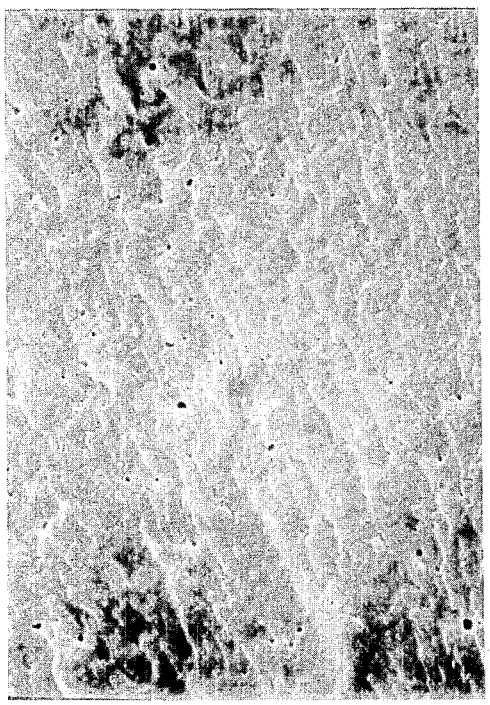
Figure 2A:
Figure 2B:
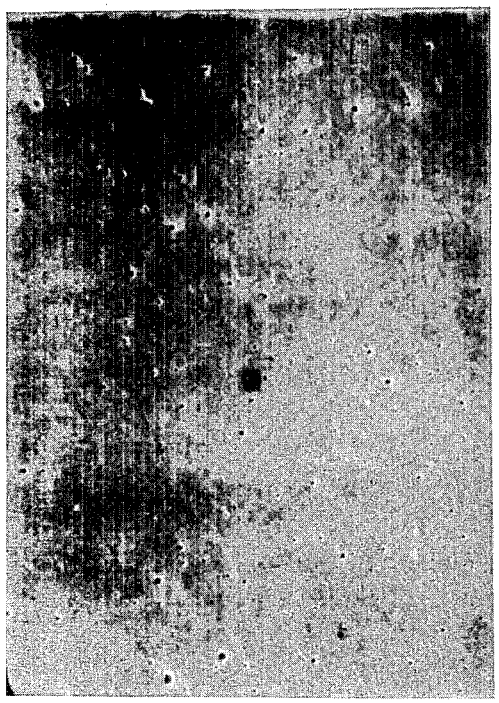
Figure 2C:
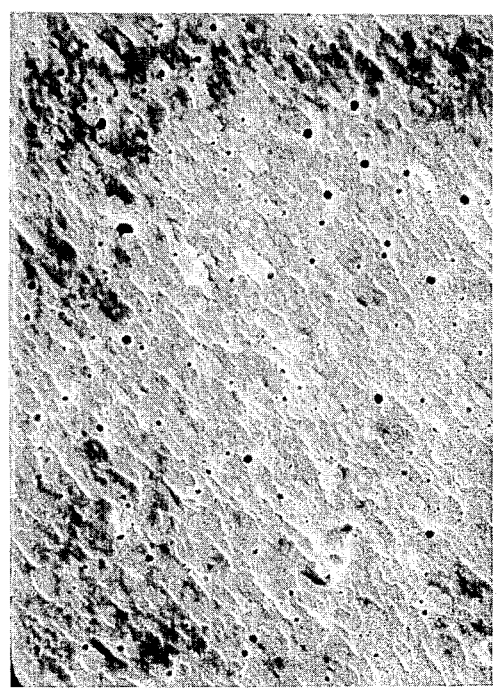
Figure 3:
Figure 3A:
Figure 3B:
Figure 3C:

Considering first the scanning electron micrographs of FIGS. 3-3C, showing the external surface characteristics of the half products, it will be seen that that the external surface of the potato half product of Example 4 is very irregular, including marked hills and valleys and relatively large and deep holes or cavities. On the other hand, the external surfaces of the corn flour samples of Examples 1-3 are similar to each other and can be characterized as relatively smooth, substantially free of hills and valleys (ignoring what is obviously surface debris), and completely without the holes or cavities exhibited by the potato half product. Turning to the cross-sectional images seen in FIGS. 2-2C, the cross-sectional surface of the potato half product of Example 4 appears to be very ragged and irregular with, at most, a very few observable openings. The cross-sectional surface of the corn rebolt flour half product is less ragged and irregular than that of the potato half product and includes more observable small openings. The cross-sectional surface of the reduction flour half product shown in FIG. 2B is smooth, as compared to that of the potato half product, and includes at least 100 clearly defined very small cap- pillary-like openings in the small total area of the micrograph, the openings being in the range of 0.01–0.06 in. on the photograph and therefore $1.12 \times 10^{-6} - 2.17 \times 10^{-5}$ in. on the actual cross-sectional surface. As seen in FIG. 2C, the cross-sectional surface of the half product from the flour derived from degerminated corn is much smoother than the cross-sectional surfaces of any of the other half products and contains substantially the same number of tiny openings as does the cross-sectional surface of the half product from corn reduction flour, though the openings seen in FIG. 2C appear to be of somewhat smaller average diameter than the openings seen in FIG. 2B. Comparing the micrographs of FIGS. 2-2C, the ragged unevenness of the cross-sectional surfaces increases progressively from FIG. 2C to FIG. 2. Though the cross-sectional surface of the rebolt flour half product, FIG. 2A, is similar to that of the reduction flour half product, it exhibits deeper hill-and-valley raggedness, similar to but less marked than the cross-sectional surface seen in FIG. 2 for the potato half product. We interpret the cross-sectional surface smoothness, best in FIG. 2C, as resulting both from the uniformity of the gelatinized starch matrix and the relative proportion of starch from the horny endosperm of the corn kernel. Thus, in all examples, cooker extruder 1 was operated in an effort to achieve maximum uniformity of the gelatinized starch matrix. Comparing Example 4 with Examples 1-3, it is apparent that, regardless of whether the gelatinizable starch is predominantly from the horny endosperm or from the soft endosperm, a more uniform starch matrix is achieved with corn than with potato. But comparison of the micrographs of FIGS. 2B and 2C with the micrograph of FIG. 2A, it is apparent that, when the starch matrix is predominantly of starch from the horny endosperm of the corn, the gelatinized starch matrix is more uniform and includes more and smaller capillary-like cells or voids than when the starch is predominantly from the soft endosperm of the corn.

Examples 1-4 demonstrate that, while the conventional potato formulation of Example 4 yields a half product which can be puffed by frying, but not by baking, the puffed potato product does not match the puffed corn products of Examples 1 and 2, particularly as to uniformity and appearance. Considering the scanning electron micrographic characterization of the half products and the results explained in Examples 1-4, it is apparent that the superiority of the half products derived from the flour from degerminated corn meal and corn reduction flour results because of (1) the fact that those half products are based on starch from the horny endosperm of the corn and (2) the fact that the method produces in the half product a very uniform matrix of that starch, properly gelatinized, with much of the moisture content of the half product trapped in the uniform, very small diameter capillary voids or channels represented by the openings seen in the micrographs of FIGS. 2B and 2C.

The following example demonstrates that the invention cannot be practised with conventional corn grits.

EXAMPLE 5

The procedure of Example 1 was repeated except that corn grits was used in place of the reduction flour of Example 1. The grits were prepared by tempering yellow corn, running the tempered corn through a conventional degerminator, and screening the resulting product to provide a corn grits fraction and a meal and flour fraction. Employing the corn grits fraction, the relatively large particles of the corn grits jammed the gelatinizing cooker extruder.

So far as we have been able to determine, snack food half products produced according to the prior art could not be puffed satisfactorily by microwaving. We have discovered that, using the special corn materials of this invention, half products can be produced which can be puffed to provide an increase in size of at least about 100% (compared with the half product size) and with puffing being uniform throughout the piece, especially when the initial formulation includes 1-3% by weight sodium chloride and/or a small proportion of pregelatinized tapioca starch. The following examples are illustrative.

EXAMPLE 6

Figure 4B:
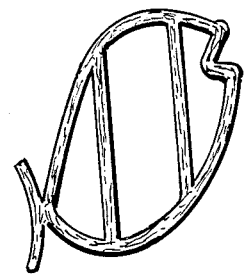

The procedure of Example 1 was duplicated, using the same formulation, but with the forming extruder equipped with a die to produce formed pieces of the fish shape shown in FIG. 4B, the resulting formed pieces averaging 0.65 in. (16.25 mm.) in length with the diameter of the strand-like portions of the shape averaging about 0.065 in. (1.6 mm.) in diameter. The half products expanded by approximately 100% when fried in accordance with Example 1 and also when baked in accordance with Example 1. However, when puffing by microwaving was attempted, the half products did not expand adequately and the expansion was not uniform throughout the piece.

The procedure was again repeated to form the fish shape but with the initial mixture comprising 98 parts by weight of the corn reduction flour, 2 parts by weight of sodium chloride and added water adequate to bring the total moisture content (including that of the reduction flour) to 31% by weight. The resulting half products were essentially the same as obtained as described in the preceeding paragraph. However, the salt-containing half products expanded uniformly to approximately twice their original size when treated in a conventional domestic microwave oven for 1.5 min.

To demonstrate the similar effectiveness of pregelatinzed tapioca starch as an additive, the procedure was again repeated but with the initial mixture comprising 90 parts by weight of the corn reduction flour and 10 parts by weight of pregelatinized tapioca flour, water being added to bring the total moisture content to 31% by weight. The resulting half products were essentially the same as described in the first paragraph of this example and puffed uniformly to approximately twice their original size when treated in a conventional domestic microwave oven for 1.5 minutes.

EXAMPLE 7

Use of both salt and tapioca starch appear to be synergistic so far as puffability of the half product is concerned. To demonstrate this effect, a first quantity of half products was produced by repeating the procedure of Example 1 but with the initial mixture comprising 98 parts by weight of the corn reduction flour and 2 parts by weight of sodium chloride, total moisture content of the mixture being adjusted to 31% by weight. A second quantity of half products was produced in the same fashion, except that the initial mixture contained 90 parts by weight of the corn reduction flour and 10 parts by weight of pregelatinized tapioca starch. A third quantity of half products was produced in the same fashion, except that the initial mixture contained 90 parts by weight of the corn reduction flour, 8 parts by weight of pregelatinized tapioca starch and 2 parts by weight of sodium chloride. Microwaved under identical conditions, half products of the third quantity puffed to a final size approximately twice that obtained with the first and second quantities of half products.

The following examples illustrate practice of the invention to produce half products which will puff satsifactorily when an ingredient must be included which markedly inhibits puffing.

EXAMPLE 8

To produce a snack food half product containing a substantial proportion of full fat almond material, an ingredient which so markedly inhibits puffing that no satisfactory product containing a substantial proportion of full fat almond material has heretofore been produced, the procedure of Example 1 was repeated except that the initial mix consisted of 68% of the corn reduction flour, 15% of full fat almond flour, 15% pregelatinized tapioca starch and 2% sodium chloride (all percentages by weight), the total moisture content of the mix being adjusted to 31% by weight by introduction of additional water. The resulting half products were fried in accordance with Example 1 and expanded to at least twice the size of the original half product.

EXAMPLE 9

To demonstrate the invention when bran is included as the ingredient which inhibits puffing, Example 1 was repeated except that the initial mix consisted of 78% by weight of the corn reduction flour, 20% by weight of finely particulate corn bran and 2% by weight of sodium chloride, the total moisture content being adjusted to 31% by weight by adding water. Again, the half products increased to at least twice their original size when fried according to Example 1.

When an edible sodium salt and/or tapioca starch are used as described above, the improving effect is believed to be because the additive increases the elasticity or resilience of the starch matrix. When the sodium salt is used only to enhance puffing by microwaving, a range of 1–3% by weight is particularly advantageous, though proportions in the range of 0.5–5% can be used, with the upper limit being mainly established by the effect on flavor of the product. Used alone, pregelatinized tapioca starch can be included in proportions in the range of 5–25% by weight.

The following example demonstrates the unsuitability of ordinary "corn flour" available by that term in, e.g., 1970.

EXAMPLE 10

Corn flour as produced in a dry corn mill circa 1970, when all of the flour streams of the mill were combined in a single bin, was synthesized by blending 60 parts by weight of corn rebolt flour with 40 parts by weight of corn reduction flour. Using that blend as the corn material, the procedure of Example 1 was repeated except that the die of the forming extruder was such as to produce the fish shape shown in FIG. 4B, half products of that shape being more easily puffed than are half products of the wagon wheel shape used in Example 1. Upon being fried in accordance with Example 1, the half products expanded by only one half of the original maximum dimension. Failure of the half products of this example to expand satisfactorily, even when fried (the puffing method most likely to produce maximum expansion), demonstrates the importance of using a corn material in which the starch is at least predominantly from the horny endosperm of the corn and starch from the floury or soft endosperm is at least minimized.

Figure 4C:

The following example illustrates the invention as applied to production of half products having the spherical shape shown in FIG. 4C.

EXAMPLE 11

The procedure of Example 1 was repeated with the initial mix consisting of 76.5% of the corn reduction flour and 23.5% added water to bring the total moisture content (including the native moisture of the flour) to 34%. The die orifice of the forming extruder was in the form of a bore having a cylindrical wall of 0.16 in. (4 mm.) diameter. Under the conditions recited in Example 1, the dough emerging from the die of the forming extruder had a rounded leading end, constituting half of the desired sphere. The speed of the rotary cutting knife was adjusted so that the extruded dough was cut off essentially at the trailing end of the hemispherical leading end, with the result that the trailing end of the cut piece expanded (rearwardly with respect to the direction of extrusion) hemispherically to complete the desired sphere. The dried half products had a diameter of approximately 0.19 in. (4.7 mm.). Upon being fried according to Example 1, the half products puffed to such a degree that the maximum dimension of the somewhat irregularly shaped puffed product was more than twice the diameter of the half product.

An important advantage of the invention is that it makes possible the production of satisfactorily puffable half products of relatively complex extruded shape as compared to, e.g., the simple "chips" of the prior art. It must be noted, however, that not every complex extruded shape produced according to the invention can be puffed by baking, even though puffing by frying is achieved. Shapes in which all portions of the formed piece are of approximately the same mass, such as the fish shape of FIG. 4B, when produced according to the invention can be both fried and baked and are best for the microwaving embodiments of the invention. But some complex shapes having a portion which is relatively massive as compared to other portions can be satisfactorily puffed only by frying, even when the shaped piece is produced according to the invention. Of course, even without following the teachings of the invention, some half products can be made to puff adequately by including a puff-promoting additive such as tapioca starch, if a large proportion of the additive is used. But, with tapioca starch currently selling at eighteen cents per pound, addition of large amounts of that starch is economically undesirable. Further, inclusion of relatively large amounts of tapioca starch causes the puffed product to lose its crunchiness as chewing of the puffed product proceeds.

What is claimed is:

1. A food half product in the form of a hard unitary body comprising a uniform matrix of gelatinized starch at least predominantly from the horny endosperm of corn and said gelatinized starch having distributed therethrough a multiplicity of capillary-like voids on the order of 0.01–0.06 inch in transverse dimension, the outer surface of the body being relatively smooth and substantially free of holes or cavities, the half product having a total moisture content of 9.5–14% by weight and being convertible by cooking to a final product in which the maximum dimension is at least twice that of the half product.

2. A half product as defined by claim 1 and further comprising
at least one ingredient in an amount sufficient to inhibit puffing; and
a minor proportion of at least one additive, selected from the group consisting of edible sodium salts and gelatinized tapioca starch, in an amount sufficient to promote puffing and thus counteract the anti-puffing effect of said at least one ingredient.

3. A half product as defined by claim 2, wherein the at least one additive comprises gelatinized tapioca starch and sodium chloride,
the tapioca starch and sodium chloride acting synergistically to improve puffing.

4. A half product as defined in claim 3, wherein the at least one ingredient which inhibits puffing is almond flour.

5. A half product as defined in claim 3, wherein the at least one ingredient which inhibits puffing is a finely particulate bran product.

6. A method for producing half-products having the characteristics defined in claim 1, comprising
  forming a preliminary mixture of
    a finely particulate corn material in which not more than 20% by weight of the particles have a maximum dimension exceeding 850 microns and not more than 15% by weight of the particles have a maximum dimension smaller than 75 microns, the starch content of the corn material being at least predominantly from the horny endosperm of the corn, the moisture content of the corn material being in the range of 9.5-12.5% by weight, and
    added water adequate to bring the total moisture content of the mixture to 30-40% by weight;
  gelatinizing the starch content of the corn material by subjecting the preliminary mixture to low shear agitation while heating the mixture at not more than 160° C.(320° F.)
  extruding the resulting dough through a shaping die and cutting the dough at the die to provide formed dough pieces; and
  drying the formed dough pieces to a moisture content of 9.5-14% by weight under conditions sufficient to inhibit case hardening.

7. The method defined in claim 6, wherein the step of gelatinizing the starch content of the corn material is accomplished by passing the mixture through an agitation zone in which the temperature increases from at least 55° C. (131° F.) adjacent the entrance of the zone to not more than 160° C.(320° F.) adjacent the exit from the zone.

8. The method defined in claim 7, wherein the agitation zone is defined by a cooker extruder, a first portion of the cooker extruder is heated at 120°-130° C.(248°-266° F.), a second portion follows the first portion and is heated at 130°-140° C.(266°-284° F.), a third portion follows the second portion and is heated at 140°-155° C.(284°-311° F.) and a fourth portion follows the third portion and is heated at 150°-160° C. (302°-320° F.).

9. The method defined in claim 8, wherein the first portion is heated at approximately 125° C.(257° F.), the second portion is heated at approximately 135° C.(275° F.), the third portion is heated at approximately 145° C.(293° F.) and the fourth portion is heated a approximately 155° C.(311° F.)

* * * * *

UNITED STATES PATENT AND TRADEMARK OFFICE
CERTIFICATE OF CORRECTION

PATENT NO. : 4,844,937
DATED : July 4, 1989
INVENTOR(S) : Raleigh J. Wilkinson and Allen T. Short It is certified that error appears in the above—identified patent and that said Letters Patent is hereby corrected as shown below:

On the title page,

"Assignee: J.R. Scott Milling Company,"

Should read

-- Assignee: J.R. Short Milling Company, --

Signed and Sealed this

Twentieth Day of March, 1990

*Attest:*

JEFFREY M. SAMUELS

*Attesting Officer*      *Acting Commissioner of Patents and Trademarks*